United States Patent [19]

Nania

[11] Patent Number: 5,183,312

[45] Date of Patent: Feb. 2, 1993

[54] CHILD AUTOMOBILE SEAT WITH FLANGE REVOLVING UPON ARCHED RIBS

[75] Inventor: Yves Nania, Tignieu, France

[73] Assignee: Renolux

[21] Appl. No.: 607,105

[22] Filed: Oct. 31, 1990

[30] Foreign Application Priority Data

Oct. 31, 1989 [FR] France .................. 89 14727

[51] Int. Cl.⁵ .............................................. A47C 1/08
[52] U.S. Cl. ..................................... 297/250; 297/349; 248/425; 108/139
[58] Field of Search ............... 297/250, 399, 240, 337; 248/349, 415–418, 131, 425; 108/139, 142

[56] References Cited

U.S. PATENT DOCUMENTS

| | | |
|---|---|---|
| 656,337 | 8/1900 | Baughman . |
| 1,508,576 | 9/1924 | Remde . |
| 1,577,807 | 3/1926 | Orwick . |
| 1,677,434 | 7/1928 | Dorton . |
| 1,803,063 | 4/1931 | Hultgren .............................. 248/425 |
| 1,951,982 | 3/1934 | Kaiser et al. ......................... 248/425 |
| 2,648,579 | 8/1953 | Slyter et al. . |
| 2,658,554 | 11/1953 | Specter et al. . |
| 2,721,604 | 10/1955 | Salvadore et al. . |
| 2,809,690 | 10/1957 | Walther et al. . |
| 3,062,583 | 11/1962 | Hamilton . |
| 3,118,641 | 1/1964 | Barish . |
| 3,138,423 | 6/1964 | Samuelson et al. . |
| 3,235,297 | 2/1966 | Fernberg . |
| 3,404,917 | 10/1968 | Smith . |
| 3,570,800 | 3/1971 | Cycowicz . |
| 3,711,056 | 1/1973 | Gmeiner et al. . |
| 3,713,619 | 1/1973 | Marty ................................. 108/139 |
| 3,794,379 | 2/1974 | Furey . |
| 3,821,825 | 7/1974 | Bailey . |
| 3,836,268 | 9/1974 | Behnke . |
| 3,906,790 | 9/1975 | Brainard, II et al. . |
| 3,934,934 | 1/1976 | Farrell, Jr. et al. . |
| 3,975,050 | 8/1976 | McKee . |
| 3,979,099 | 9/1976 | Strang . |
| 4,097,016 | 6/1978 | Petrucci . |
| 4,113,306 | 9/1978 | Von Wimmersperg . |
| 4,155,598 | 5/1979 | Swenson et al. . |
| 4,170,424 | 10/1979 | Boehm . |
| 4,205,877 | 1/1980 | Ettridge . |
| 4,226,398 | 10/1980 | Freber . |
| 4,274,674 | 6/1981 | Deloustal . |
| 4,306,749 | 12/1981 | Deloustal . |
| 4,518,139 | 5/1985 | Barfell . |
| 4,536,029 | 8/1985 | Rogers, Jr. . |
| 4,545,613 | 10/1985 | Martel et al. . |
| 4,570,997 | 2/1986 | Tanizaki et al. . |
| 4,705,255 | 11/1987 | Hofrichter . |
| 4,707,024 | 11/1987 | Schrader . |
| 4,762,364 | 9/1988 | Young . |
| 4,844,543 | 7/1989 | Ochiai . |
| 4,936,629 | 6/1990 | Young . |
| 4,971,392 | 11/1990 | Young . |

FOREIGN PATENT DOCUMENTS

| | | |
|---|---|---|
| 0302607 | 2/1989 | European Pat. Off. . |
| 8527245 | 1/1986 | Fed. Rep. of Germany . |
| 8900198 | 5/1989 | Fed. Rep. of Germany . |
| 268768 | 4/1928 | Italy . |
| 216376 | 12/1941 | Switzerland ................. 108/139 |
| 2207043 | 1/1989 | United Kingdom . |
| 9003746 | 4/1990 | World Int. Prop. O. . |

Primary Examiner—José V. Chen
Assistant Examiner—James M. Gardner
Attorney, Agent, or Firm—Oliff & Berridge

[57] ABSTRACT

A seat body comprised of a shell is articulated on a base adapted for attachment to a passenger vehicle seat. The base has a wall with a circular opening within which an upper plate and a lower plate are attached to form a swivel assembly. The swivel assembly includes a hub that rests against the edge of the wall delimiting the opening, and two flanges resting respectively above and below the wall. A spring biased lever is provided to lock the swivel assembly rotationally relative to the base.

19 Claims, 2 Drawing Sheets

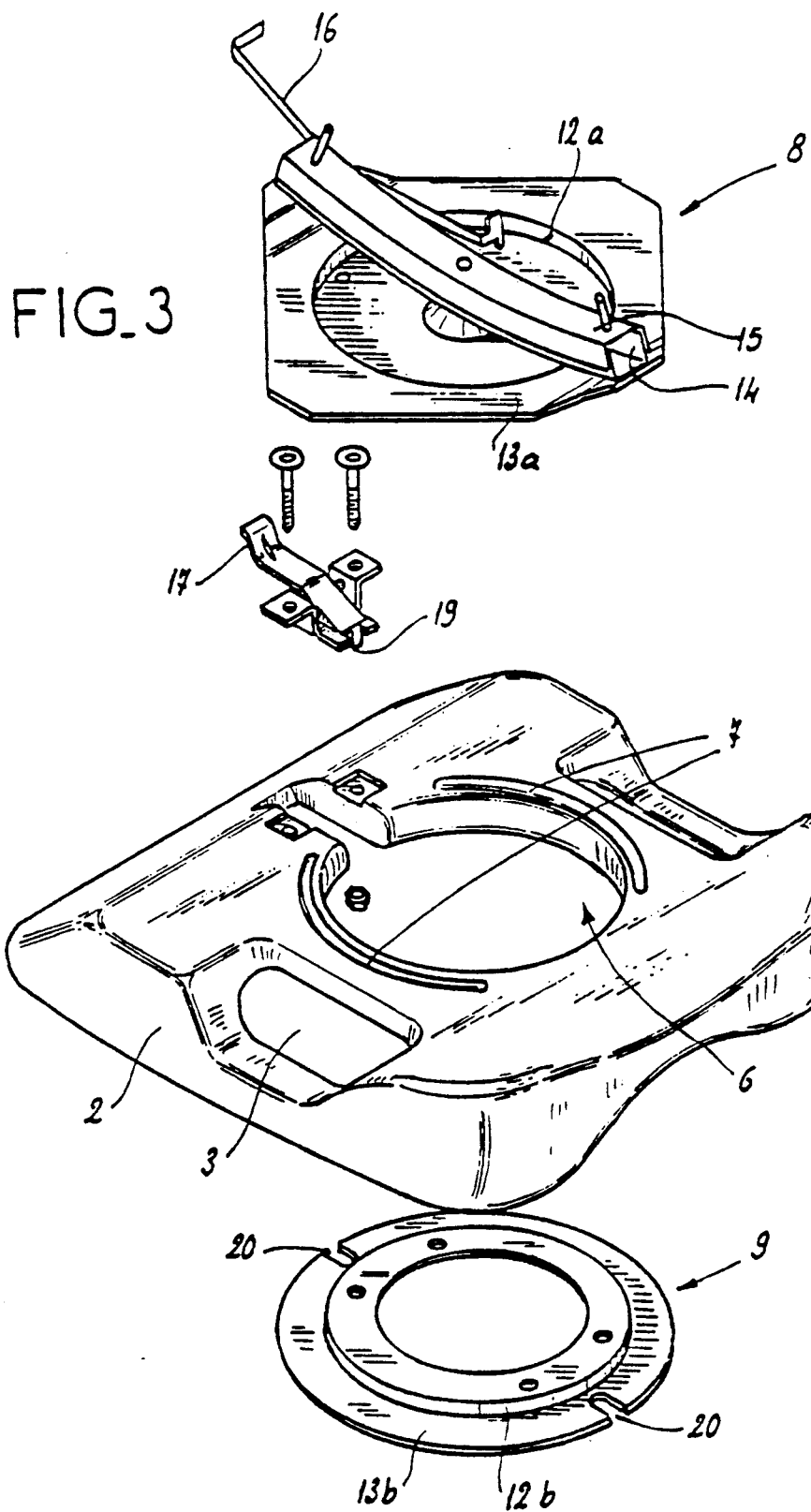
FIG_3

CHILD AUTOMOBILE SEAT WITH FLANGE REVOLVING UPON ARCHED RIBS

BACKGROUND OF THE INVENTION

The present invention relates to a child automobile seat. For their safety and comfort, young children are frequently placed in such seats when driven in an automobile.

A child automobile seat comprises a shell, usually made of synthetic material, forming a bucket seat in which the child is held by straps. The seat is upholstered and covered with a material such as fabric. The seat is generally mounted on the rear seat of an automobile, and is attached thereto with straps connected, for example, to seat belt anchoring points.

The most traditional seats have a fixed shell which is nonadjustably mounted on the individual seat or bench seat of the automobile.

In order to improve the child's comfort, it is also known that child seats may comprise a shell mounted on a base by means of a curved rail allowing the entire shell to be tilted with respect to the base.

It is useful to transport a child with the child seat facing rearward, in which position a young child is better able to tolerate sudden decelerations. It is also advantageous to have a swivelable child seat in order to be able to turn the seat toward the car door near which it is located when placing the child in the seat and lifting him out of the seat. However, known devices ensuring swiveling of the seat with respect to a base are complex, have a central joint of the seat to the base which is of only moderate durability, and are somewhat impractical in use.

SUMMARY OF THE INVENTION

A goal of the present invention is to overcome these disadvantages by providing a child automobile seat that is extremely simple in design and, when in use, requires only an extremely small number of parts to articulate the seat on a base, while ensuring easy rotation of the seat on the base.

For this purpose, the child seat has a seat body comprising a shell articulated on a base equipped with means for attaching it to the automobile. The base has a wall with an opening (preferably circular) within which an upper plate and a lower plate are attached to form a swivel assembly. The swivel assembly includes two flanges in direct contact with the wall, and preferably resting respectively on upper and lower faces of the wall. The swivel assembly further includes a hub, which may also be in direct contact with the wall. Means are also provided for locking the swivel assembly rotationally relative to the base.

Since the opening provided in the base has a large diameter, guidance with the aid of the two plates is effected over a large diameter and on extensive surface areas since this guidance takes place both at the circular edge delimiting the opening and at the flanges of the two plates above and below the seat base.

BRIEF DESCRIPTION OF THE DRAWINGS

The invention will be thoroughly understood with the aid of the description hereinbelow, with reference to the attached schematic drawings showing one embodiment of the child seat in nonlimiting fashion:

FIG. 3 is an exploded perspective view of the assembly for swiveling the seat on the base.

DESCRIPTION OF PREFERRED EMBODIMENTS

Figure 1:
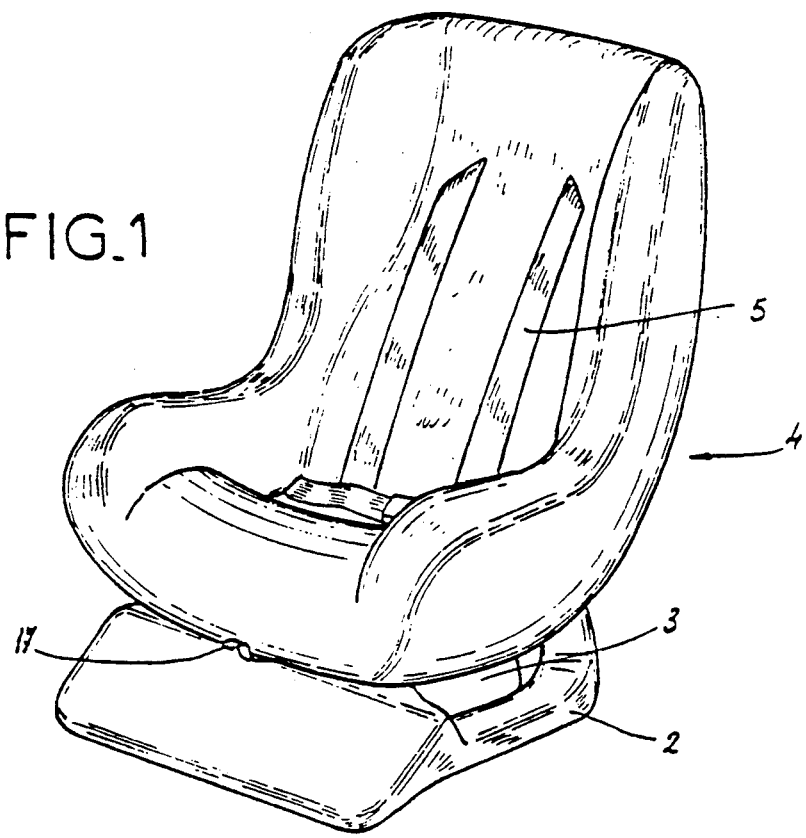
FIG. 1 is a perspective view.
Figure 2:
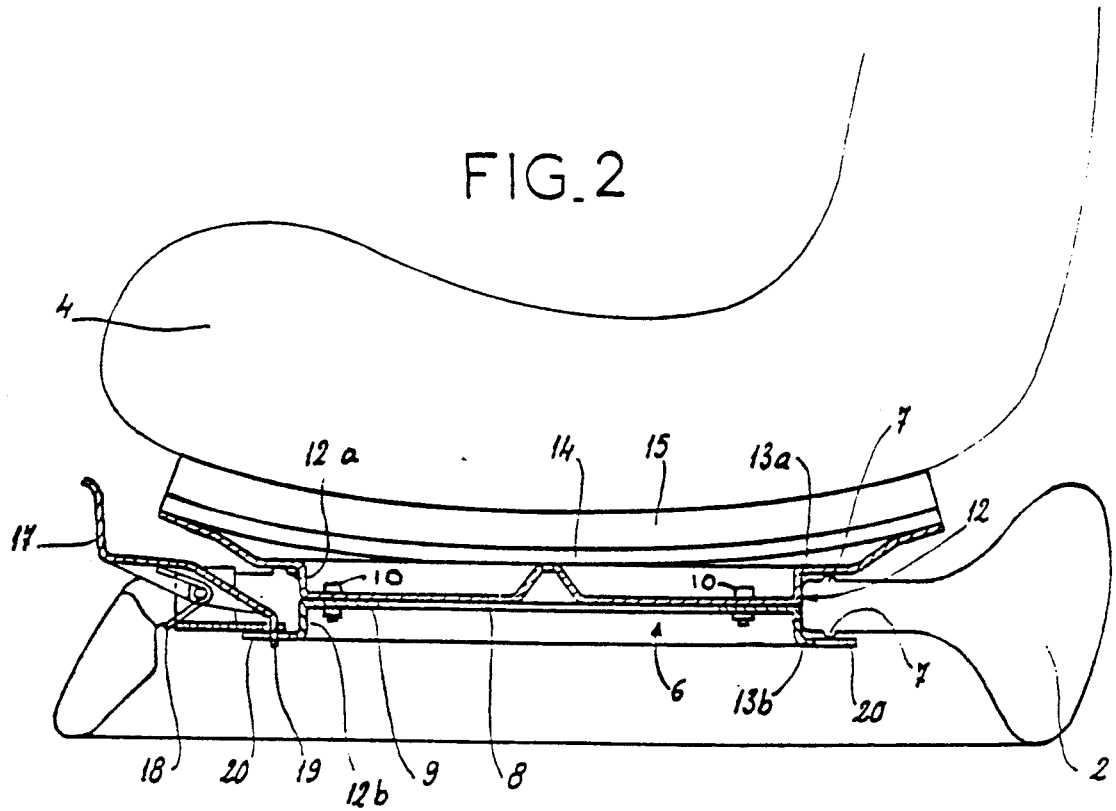
FIG. 2 is a lengthwise section of the swivel assembly, the other elements being drawn in thin lines.

In order to facilitate rotation of the seat body with respect to the base, the latter may have ribs or other protrusions which serve as supports for the flanges of the upper and lower plates. These ribs preferably have the shape of arcs of a circle centered on the axis of rotation of the seat body relative to the base.

According to another embodiment of the invention, the lower plate has a circular shape, while the upper plate on which the seat body is mounted has a substantially square shape whose diagonals are located on lengthwise and transverse axes of the seat body. This characteristic improves the stability of the seat body on its base, since the forces transmitted by the seat body to the base are essentially lengthwise and transverse forces.

According to another embodiment of the invention, the means for locking the swivel assembly rotationally relative to the base comprises a lever articulated to the base, one end of the lever being biased for receipt into a recess provided in one of the two plates.

Preferably, two diametrically opposed recesses corresponding respectively to a forward-facing seat body position and to a rearward-facing seat body position are provided. It is preferred not to be able to lock the seat body in an intermediate angular position since such a position, in the event of an accident or sharp deceleration, would be detrimental to the child's safety.

The child seat shown in the drawings has a base 2 designed to be attached to an individual seat or bench seat of an automobile or other passenger vehicle, for example with the aid of seat belt straps passing through openings 3. To this base is attached a seat body 4 of known structure, produced from a shell of synthetic material, upholstered with padding and a cover, as well as straps 5 designed to hold the child in the seat.

The base has a substantially horizontal wall with a large-diameter circular opening 6 in its central part, and ribs 7 on its upper and lower faces formed in the shape of arcs of a circle.

Inside circular opening 6 are mounted two metal plates, namely an upper plate 8 and a lower plate 9. These two plates adjoin each other within the circular opening 6, and are fastened to each other by bolts 10 to form a swivel assembly. The two plates 8 and 9 respectively have an annular hub 12a and an annular hub 12b which together form an annular hub 12 of the swivel assembly resting on the edge of the wall delimiting circular opening 6. Plates 8 and 9 also respectively have a peripheral flange 13a and a peripheral flange 13b resting respectively on the upper face of the wall and on the lower face thereof, more specifically on ribs 7 on these two faces.

As shown in particular in FIG. 3, the part of upper plate 8 located above the base has a generally square shape, with the two diagonals of the square being located on lengthwise and transverse axes of the seat body.

The seat body is mounted on the base in a known manner by two matching curved rails 14, 15 which can slide against each other when a lever 16 is actuated, rail 14 being attached to plate 8 while rail 15 is attached to seat body 4. It is thus possible to tilt seat body 4 with respect to plate 8 in order to adjust the inclination of the seat.

According to another embodiment of the invention, the base is equipped with a lever 17, acted upon by a spring or other biasing means 18, whose end 19 is designed to penetrate one of two recesses 20 provided in lower plate 9 (or alternatively in upper plate 8). The two recesses 20 are located at diametrically opposite positions. Engagement of end 19 of the lever in one of the two recesses locks the swivel assembly rotationally relative to the base in two positions: facing forward and facing rearward.

It is very easy to unlock the swivel assembly from the base by actuating lever 17, and swiveling is easy because of the large contact areas between plates 8, 9 and base 2, with no risk of jamming during the maneuver or jerking during swiveling.

In practice it is possible, in order to place the child in his seat or remove him therefrom, to set the seat body in an intermediate position in which it faces one door of the vehicle, facilitating the maneuver for the person in charge of the child. Under driving conditions, the seat body is locked into a position facing frontward or rearward, by engagement of the end 19 of lever 17 in one of the two recesses 20.

The invention is not confined to the embodiments described herein as examples; on the contrary, it covers all design alternatives. Thus, in particular, plates 8, 9 could be made of a material other than metal, the essential point being for the material to be sufficiently rigid. The shape of the plates might also be different, the essential point being for them to ensure guidance against the edge of the opening and to rest above and below the base.

What is claimed is:

1. A portable child automobile seat, for mounting on a passenger vehicle seat, comprising:
    a base for removable connection to said passenger vehicle seat, said base having a wall with an opening and upper and lower faces with arced ribs adjacent said opening;
    means for removably connecting said base to said passenger vehicle seat;
    a swivel assembly including a hub and upper and lower flanges extending from said hub, said hub being rotatably disposed within said opening and said wall being positioned between and in direct contact with said upper and lower flanges to permit said swivel assembly to rotate relative to said base, said hub being in direct contact with an edge of said wall delimiting said opening and said upper and lower flanges being in direct contact respectively with said ribs on said upper and lower faces of said wall;
    a seat body connected to said swivel assembly; and
    means for removably fastening a child in said seat body.

2. The child automobile seat of claim 1, wherein said opening is generally circular.

3. The child automobile seat of claim 1, wherein said arced ribs are centered on the axis of rotation of said seat body relative to said base.

4. The child automobile seat of claim 1, wherein said swivel assembly comprises an upper plate and a lower plate joined together to form said hub and said upper and lower flanges.

5. The child automobile seat of claim 4, wherein both said upper plate and said lower plate extend into said opening.

6. The child automobile seat of claim 4, wherein said lower plate extends into said opening.

7. The child automobile seat of claim 4, wherein said upper plate extends into said opening.

8. The child automobile seat of claim 4, said upper plate having a generally square shape.

9. The child automobile seat of claim 8, said lower plate having a generally circular shape.

10. The child automobile seat of claim 8, wherein diagonals of said upper plate are generally aligned with lengthwise and transverse axes of said seat body.

11. The child automobile seat of claim 1, further comprising means for locking said swivel assembly rotationally relative to said base.

12. The child automobile seat of claim 11, wherein at least one of said flanges includes at least one recess, and said locking means comprises a lever articulated on said base, one end of said lever being biased for receipt into said recess.

13. The child automobile seat of claim 12, said at least one recess comprising two diametrically opposed recesses.

14. A portable child automobile seat, for mounting on a passenger vehicle seat, comprising:
    a base for removable connection to said passenger vehicle seat, said base having a wall with a generally circular opening and upper and lower faces with integral arced ribs adjacent said opening;
    means for removably connecting said base to said passenger vehicle seat;
    a swivel assembly including an upper plate and a lower plate joined together to form a hub and upper and lower flanges extending from said hub, said hub being rotatably disposed within said opening and said wall being positioned between said upper and lower flanges to permit said swivel assembly to rotate relative to said base, said hub being in direct contact with an edge of said wall delimiting said opening and said upper and lower flanges being in direct contact respectively with said ribs on said upper and lower faces of said wall;
    means for locking said swivel assembly rotationally relative to said base;
    a seat body connected to said swivel assembly; and
    means for removably fastening a child in said seat body.

15. The child automobile seat of claim 14, said upper plate having a generally square shape.

16. The child automobile seat of claim 15, said lower plate having a generally circular shape.

17. The child automobile seat of claim 15, wherein diagonals of said upper plate are generally aligned with lengthwise and transverse axes of said seat body.

18. A portable child automobile seat, for mounting on a passenger vehicle seat, comprising:
    a base for removable connection to said passenger vehicle seat, said base having a wall with an opening and upper and lower faces with arced ribs adjacent said opening;
    means for removably connecting said base to said passenger vehicle seat;
    a swivel assembly including a generally square upper plate and a lower plate joined together to form a hub and upper and lower flanges extending from said hub, said hub being rotatably disposed within said opening and said wall being positioned between said upper and lower flanges to permit said swivel assembly to directly bear on said wall and rotate relative to said base, said upper and lower flanges being in direct contact respectively with said ribs on said upper and lower faces of said wall;

a seat body connected to said swivel assembly; and
means for removably fastening a child in said seat body.

19. The child automobile seat of claim 18, wherein diagonals of said upper plate are generally aligned with lengthwise and transverse axes of said seat body.

* * * * *